R. W. SEWELL.
WHEEL FOR MOTOR AND OTHER VEHICLES.
APPLICATION FILED FEB. 20, 1909.
1,058,005.
Patented Apr. 1, 1913.
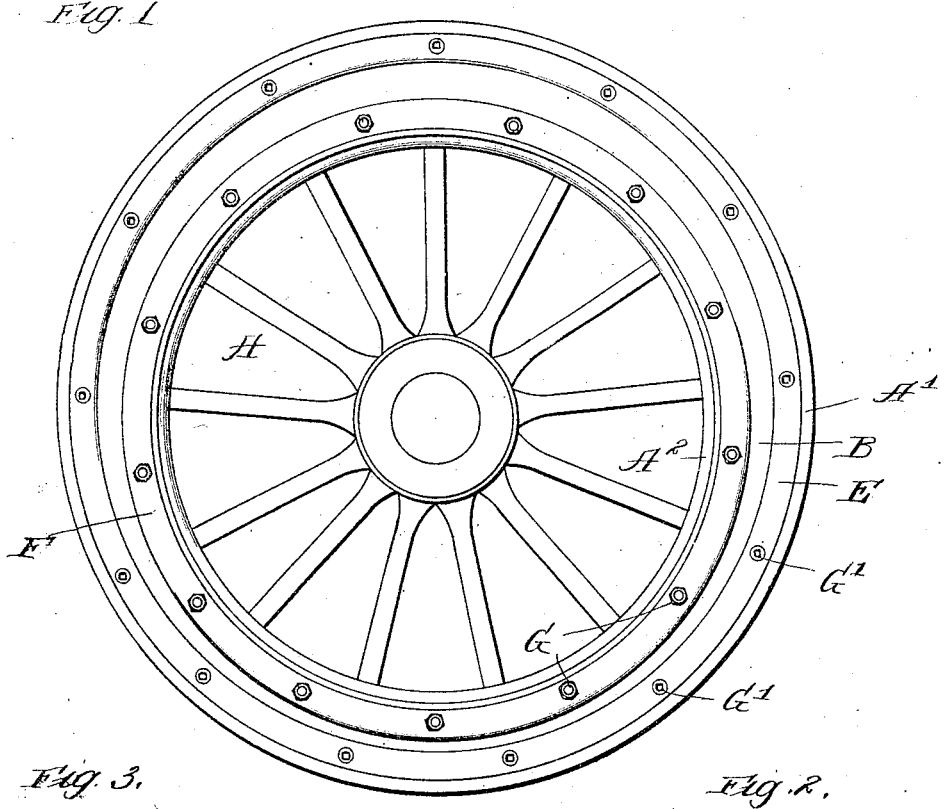
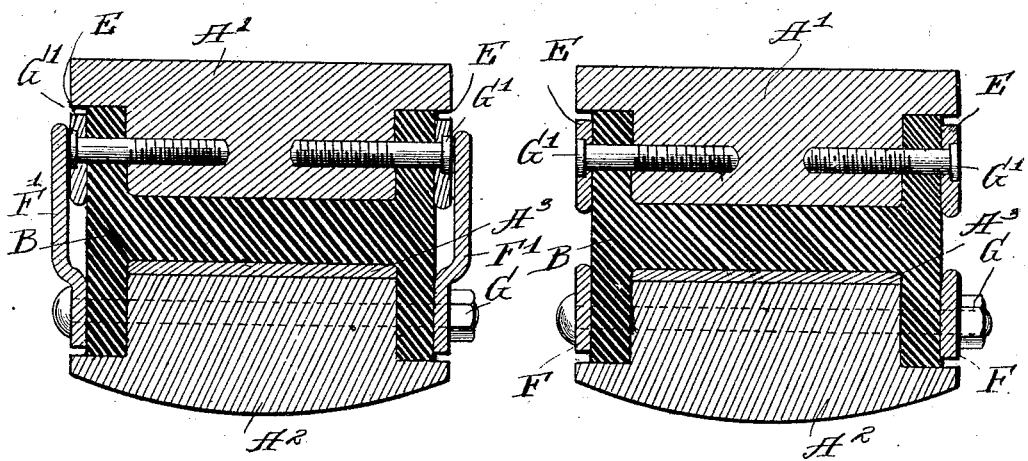
WITNESSES
INVENTOR,
Robert William Sewell
By Knight Bros.
Attorneys.

UNITED STATES PATENT OFFICE.

ROBERT WILLIAM SEWELL, OF BROOKLYN, NEW YORK, ASSIGNOR TO SEWELL CUSHION WHEEL COMPANY, OF DETROIT, MICHIGAN.

WHEEL FOR MOTOR AND OTHER VEHICLES.

1,058,005.  Specification of Letters Patent.  Patented Apr. 1, 1913.

Application filed February 20, 1909. Serial No. 479,207.

*To all whom it may concern:*

Be it known that I, ROBERT WILLIAM SEWELL, of Brooklyn, New York, United States of America, have invented new and useful Improvements in and Connected with Wheels for Motor and other Vehicles, of which the following is a specification.

This invention relates to an improvement in cushion tires for wheels constructed with outer and inner fellies and in which any shock or vibration imparted to the outer felly will be taken up by a cushioning element and not transmitted to the hub of the wheel and thence to the vehicle to which the wheel is attached.

One object of the invention is to construct and adapt the cushioning so that radially as well as laterally imposed shocks will be taken up partly by compression and partly by tension on the cushioning element.

Another object of the present invention is to provide means for preventing undue lateral displacement of the cushioning device, while at the same time permitting limited lateral movement thereof sufficient to relieve shocks in that direction.

A further object is to so construct the cushioning element, that any compression thereof may be taken up in the center instead of causing the sides of said element to be unduly spread.

Further objects and advantages will appear from the following description with reference to the accompanying drawings, wherein, Figure 1 is a side view showing the relative positions of the inner and outer fellies when the wheel is conveying a load; Fig. 2 is a radial section through a part of Fig. 1 on an enlarged scale; and Fig. 3 is the same as Fig. 2 embodying a modified form of the clamping rings.

Referring now more specifically to the drawing A designates a wheel comprising the outer and inner rims or fellies $A^1$ and $A^2$, which are concentrically arranged. The inner felly or rim $A^2$, which is secured to the wheel spokes is preferably provided with a suitable steel tire $A^3$. Between these two fellies or rims and resting upon the tire $A^3$ (when employed) a cushioning element B is secured, (see Figs. 2 and 3) consisting of any suitable shock absorbing material. In this illustrative embodiment, the cushion element B is formed substantially H-shaped, the central portion thereof fitting between the two rims $A^1$ and $A^2$ while the flanged edges fit against the faces of the rims, preferably in cut-away portions of the rim, and are secured thereto by means of bolts or screws, G and $G^1$ (see Fig. 3) the heads of which are counter sunk in the annular rings E and F which preferably lie flush with the lateral edges of the rims. But the particular formation of the cushion element may be varied at will so long as it embodies an intermediate compression member and relatively thin annular portions on either side of and integral with said compression member, attached to the fellies radially within and beyond the intermediate compression member.

In Fig. 3 there is shown a modified form of the inner rings $F^1$. The outer rings E in this figure are of substantially the same construction as in Figs. 1 and 2, but the inner rings are bent laterally as at $F^1$ and extended radially so as to overlap the rings E, thus forming an inclosure or guard for the cushion element and at the same time permitting freedom of relative movement of the fellies or rims radially while limiting their relative displacement laterally, though not sufficiently to destroy the absorption of lateral shocks.

From the foregoing description it will be understood that when the wheel is under pressure, the cushion element will be compressed adjacent to the point of contact with the road bed. The inner and outer fellies however, being capable of relative radial movement, and also of limited relative lateral movement, the shocks or vibrations will be transmitted to the cushioning element interposed between the two fellies, thus greatly reducing the shocks and vibrations which are transmitted, through the fixed or inner felly to the vehicle to which the wheel is secured.

I claim—

1. A vehicle wheel comprising inner and outer fellies and an intermediate resilient spacing means connecting said fellies and yieldingly resisting relative movement between them by the elasticity of said spacing means in the directions of both tension and compression; said spacing means comprising an intermediate compression member and relatively thin annular portions on either side of said compression member;

said thin annular portions being connected with the fellies radially within and beyond the intermediate compression member, respectively; said thin annular members being integral with said intermediate compression member of said spacing means.

2. A vehicle wheel comprising inner and outer fellies and an intermediate resilient spacing means connecting said fellies and yieldingly resisting relative movement between them by the elasticity of said spacing means in the directions of both tension and compression; said spacing means comprising an intermediate compression member and relatively thin annular portions on either side of said compression member; said thin annular portions being connected with the fellies radially within and beyond the intermediate compression member, respectively; said thin annular members being integral with said intermediate compression member of said spacing means and together constituting therewith a rubber annulus of substantially H-shaped cross section.

In testimony whereof I affix my signature in presence of two witnesses.

ROBERT WILLIAM SEWELL.

Witnesses:
R. BALDWIN MYERS,
I. N. GORDON.